(12) United States Patent
Salmimaa et al.

(10) Patent No.: US 12,293,059 B2
(45) Date of Patent: May 6, 2025

(54) APPARATUS AND METHOD FOR RENDERING VISUAL CONTENT ON A DISPLAY SCREEN

(71) Applicant: Nokia Technologies Oy, Espoo (FI)

(72) Inventors: Marja Pauliina Salmimaa, Tampere (FI); Miikka Tapani Vilermo, Tampere (FI); Arto Juhani Lehtiniemi, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/592,781

(22) Filed: Mar. 1, 2024

(65) Prior Publication Data
US 2024/0319845 A1 Sep. 26, 2024

(30) Foreign Application Priority Data

Mar. 23, 2023 (EP) .................................... 23163599

(51) Int. Cl.
*G06F 3/0482* (2013.01)
*G02B 27/01* (2006.01)
(Continued)

(52) U.S. Cl.
CPC ....... *G06F 3/0482* (2013.01); *G02B 27/0172* (2013.01); *G06F 3/013* (2013.01); *G06F 3/04842* (2013.01); *G02B 2027/0178* (2013.01)

(58) Field of Classification Search
CPC .......... G02B 27/017; G02B 2027/0178; G02B 2027/0183; G02B 27/0093;
(Continued)

(56) References Cited

U.S. PATENT DOCUMENTS 9,864,191 B2 1/2018 Kato et al.
10,360,877 B2 7/2019 Osman et al.
(Continued)

FOREIGN PATENT DOCUMENTS

WO 2012/036638 A1 3/2012
WO 2013/170073 A1 11/2013

OTHER PUBLICATIONS

"A contact lens has been created that zooms in when you blink", Techspot, Retrieved on Mar. 29, 2024, Webpage available at : https://www.techspot.com/news/81186-contact-lens-has-created-zooms-when-you-blink.html.
(Continued)

*Primary Examiner* — Nelson M Rosario
(74) *Attorney, Agent, or Firm* — Nokia Technologies Oy

(57) ABSTRACT

An apparatus, method and computer program is described for rendering visual content on a display screen. The apparatus comprises a means for rendering visual content on a display screen. The means for rendering is configured to render said visual content at a first rendering position on said display screen. The apparatus further comprises a means for detecting a user gaze direction through an eye correction means towards said first rendering position. The apparatus further comprises a means for receiving data relating to optical properties of said eye correction means at said detected user gaze direction. The apparatus further comprises a means for determining if said optical properties at said detected gaze direction provide a threshold level of suitability for viewing said visual content.

16 Claims, 9 Drawing Sheets

(51) Int. Cl.
*G06F 3/01* (2006.01)
*G06F 3/04842* (2022.01)

(58) Field of Classification Search
CPC .... G02B 27/0172; G02C 5/008; G02C 7/021;
G02C 7/027; G02C 7/046; G02C 7/083;
G02C 7/101; G02C 11/04; G02C 7/04;
G02C 7/108; G02C 7/081; G06F 3/011;
G06F 3/012; G06F 3/013; G06F 3/015;
G06F 3/017; G06F 2203/011; G06F
3/0482; G06F 3/04842; G01M 11/02;
H04Q 1/20; H04Q 9/00; H04Q 9/02;
G05B 19/409; G05B 2219/36159; G05B
2219/36167; G06T 11/00
See application file for complete search history.

(56) References Cited

U.S. PATENT DOCUMENTS

| | | | | |
|---|---|---|---|---|
| 10,416,451 | B2 | 9/2019 | Tannoudji et al. | |
| 10,466,391 | B2* | 11/2019 | Yadin | G02F 1/29 |
| 11,428,955 | B1 | 8/2022 | Lewis | |
| 11,556,012 | B2 | 1/2023 | Grutman et al. | |
| 12,038,629 | B1* | 7/2024 | Lewis | G02C 7/083 |
| 2015/0286070 | A1 | 10/2015 | Aikawa | |
| 2022/0003632 | A1 | 1/2022 | Glasenapp | |

OTHER PUBLICATIONS

"SeeBOOST Electronic Glasses Improve Central Vision: Interview with CEO Patrick Antaki", Regenerative Medical Group, Retrieved on Mar. 29, 2024, Webpage available at : https://news.regenerativemedgroup.com/seeboost-electronic-glasses-improve-central-vision-interview-with-ceo-patrick-antaki/.

"Apple's future Headset could sharpen focus of objects using a Liquid Filed Lens System and 3D LiDAR Sensors", Patentlyapple, Retrieved on Mar. 29, 2024, Webpage available at : hhttps://www.patentlyapple.com/patently-apple/2020/03/apples-future-headset-could-sharpen-focus-of-objects-using-a-liquid-filed-lens-system-and-3d-lidar-sensors.html.

Partial European Search Report received for corresponding European Patent Application No. 23163599.6, dated Sep. 22, 2023, 11 pages.

Extended European Search Report received for corresponding European Patent Application No. 23163599.6, dated Feb. 2, 2024, 15 pages.

* cited by examiner

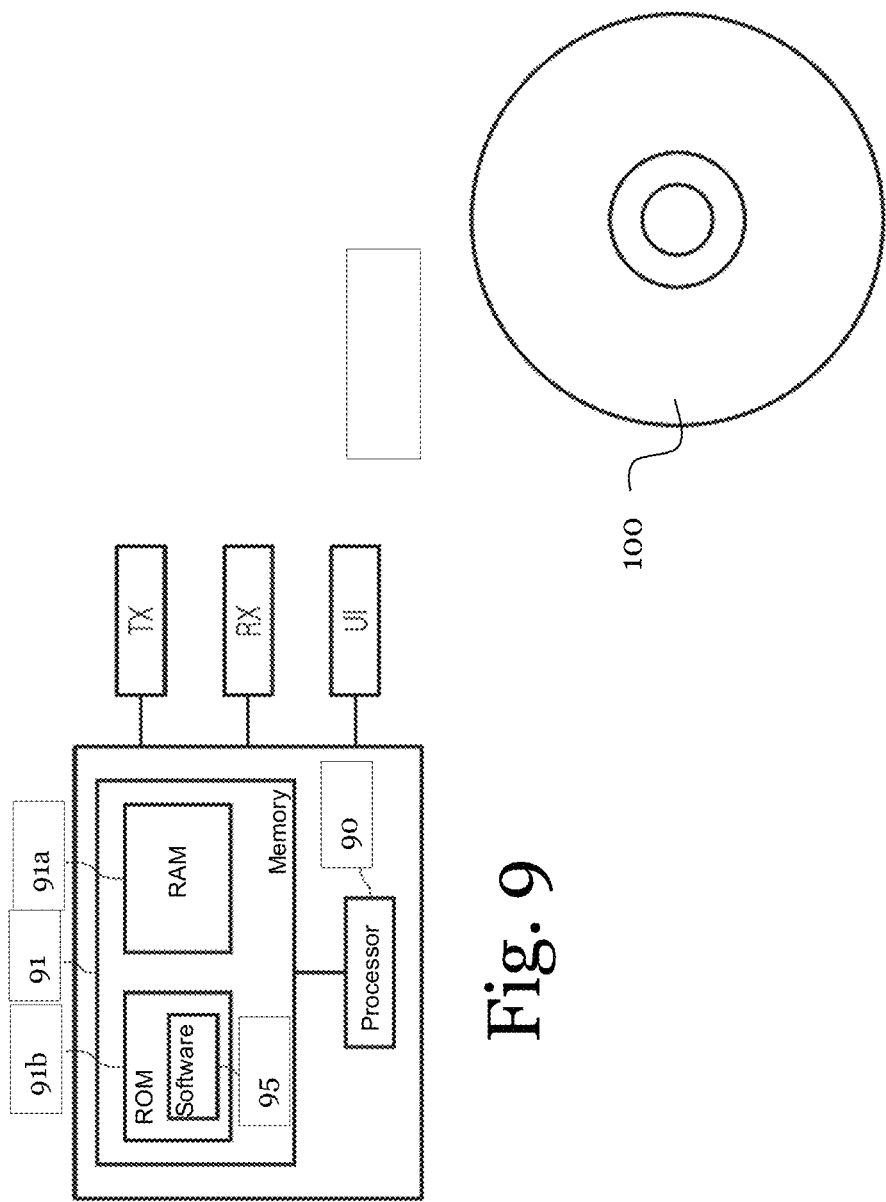

APPARATUS AND METHOD FOR RENDERING VISUAL CONTENT ON A DISPLAY SCREEN

RELATED APPLICATION

This application claims priority to European patent application number 23163599.6, filed on Mar. 23, 2023, the content of which is incorporated herein by reference in its entirety.

FIELD

Example embodiments describe systems, apparatus, methods and/or computer programs for rendering visual content on a display screen.

BACKGROUND

Presbyopia and nearsightedness are refractive errors reducing eyes' ability to focus on nearby or far-away objects. Gradual loss of ability to focus on nearby objects is a natural part of ageing and can be easily corrected by wearing corrective eyeglasses. Eyeglasses correcting presbyopia may comprise bifocal or varifocal lenses. In general, bifocal lenses are optimized for two discrete depths, varifocal lenses provide continuous vision for all distances in a single lens. In general, bifocal lenses have two different areas with two separate optical powers. For example, one area may be configured for viewing distant objects (typically the top part of the lens) and the second area may be configured for objects located near in the visual field (typically the lower part of the lens). Thus, the user may focus on distant or close objects by changing gaze direction through the glasses. There remains an ongoing requirement for further developments in this field.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is described an apparatus comprising: means for rendering visual content at a first rendering position on a display screen; means for detecting a user gaze direction through an eye correction means (e.g. corrective glasses such as bifocal glasses) towards said first rendering position; means for receiving data relating to optical properties (e.g. focal point, transparency etc) of said eye correction means at said user gaze direction; and means for determining if said optical properties at said detected user gaze direction provide a threshold level of suitability for viewing said visual content (i.e. said user viewing said visual content at said first rendering position on said display screen) (e.g. ensuring said visual content is in focus for the user).

The means for rendering may be configured to render said visual content at a second rendering position on said display screen if said optical properties of said eye correction means at said detected user gaze direction provide a suitability below said threshold level.

The second rendering position may correspond to a second user gaze direction through said eye correction means, wherein optical properties of said eye correction means at said second user gaze direction provide a suitability (for said user viewing said visual content) above said threshold level.

The means for rendering may be further configured to smoothly transition said visual content from said first rendering position to said second rendering position (e.g. by sliding or fading said visual content from said first rendering position to said second rendering position).

The apparatus may further comprise means for augmenting said visual content on said display screen, wherein said means for augmenting comprises augmented reality glasses.

The augmented reality glasses may comprise said eye correction means.

The apparatus may further comprise means for controlling transparency of said eye correction means at one or more user gaze directions.

The transparency control means may be configured to provide a first transparency level at user gaze directions having a suitability above said threshold level and a second transparency level at user gaze directions having a suitability below said threshold level, wherein said first transparency level is higher than said second transparency level.

The transparency control means may be further configured to provide said first transparency level at user gaze directions away from said display screen.

The apparatus may further comprise means for controlling the focus of said eye correction means at one or more user gaze directions.

The focus control means may be configured to focus said eye correction means onto said display screen at user gaze directions having a suitability above said threshold level.

The apparatus may further comprise means for determining a focus of said user's eyes.

The apparatus may further comprise means for determining a relative position and/or orientation of said display screen and said eye correction means.

According to a second aspect, there is described a method comprising: rendering visual content at a first rendering position on a display screen; detecting a user gaze direction through an eye correction means towards said first rendering position; receiving data relating to optical properties of said eye correction means at said detected user gaze direction; and determining if said optical properties at said detected user gaze direction provide a threshold level of suitability for viewing said visual content.

Rendering may render said visual content at a second rendering position on said display screen if said optical properties at said detected user gaze direction is below said threshold level.

Said second rendering position may correspond to a second user gaze direction through said eye correction means, wherein optical properties of said eye correction means at said second user gaze direction may provide a suitability above said threshold level.

Rendering may smoothly transition said visual content from said first rendering position to said second rendering position.

The method may further comprise augmenting said visual content on said display screen, wherein said augmenting may comprise using augmented reality glasses.

The augmented reality glasses may comprise said eye correction means (or vice versa).

The method may further comprise controlling transparency of said eye correction means at one or more user gaze directions.

Transparency control may provide a first transparency level at user gaze directions having a suitability above said threshold level and a second transparency level at user gaze directions having a suitability below said threshold level, wherein said first transparency level is higher than said second transparency level.

Transparency control may provide said first transparency level when said intersection point is outside said display screen.

The method may further comprise controlling the focus of said eye correction means at one or more user gaze directions.

The focus control may focus said eye correction means onto said display screen at user gaze directions having a suitability above said threshold level.

The method may further comprise determining a focus of said user's eyes.

The method may further comprise determining a relative position and/or orientation of said display screen and said eye correction means.

In a third aspect, this specification describes computer-readable instructions which, when executed by a computing apparatus, cause the computing apparatus to perform (at least) any method as described herein (including the methods of the second aspect described above).

In a fourth aspect, this specification describes a computer-readable medium (such as a non-transitory computer-readable medium) comprising program instructions stored thereon for performing (at least) any method as described herein (including the methods of the second aspect described above).

In a fifth aspect, this specification describes an apparatus comprising: at least one processor; and at least one memory including computer program code which, when executed by the at least one processor, causes the apparatus to perform (at least) any method as described herein (including the methods of the second aspect described above).

In a sixth aspect, this specification describes a computer program comprising instructions which, when executed by an apparatus, cause the apparatus to: render visual content at a first rendering position on a display screen; detect a user gaze direction through an eye correction means towards said first rendering position; receive data relating to optical properties of said eye correction means, at said detected user gaze direction; and determine if said optical properties at said detected user gaze direction provide a threshold level of suitability for viewing said visual content.

According to a seventh aspect, there is provided an apparatus comprising: at least one processor; and at least one memory including computer program code which, when executed by the at least one processor, cause the apparatus to: render visual content at a first rendering position on a display screen; detect a user gaze direction through an eye correction means towards said first rendering position; receive data relating to optical properties of said eye correction means at said detected user gaze direction; and determine if said optical properties at said detected user gaze direction provide a threshold level of suitability for viewing said visual content.

In an eighth aspect, this specification describes: an output module (or some other means) for rendering visual content at a first rendering position on a display screen; a control module (or some other means) for detecting a user gaze direction through an eye correction means towards said first rendering position; an input module (or some other means) for receiving data relating to optical properties of said eye correction means at said detected user gaze direction; and the control module (or some other means) for determining if said optical properties at said detected user gaze direction provide a threshold level of suitability for viewing said visual content.

BRIEF DESCRIPTION OF THE DRAWINGS

Example embodiments will now be described by way of non-limiting example, with reference to the accompanying drawings, in which:

FIG. 9 illustrates an apparatus according to one or more example embodiments;

FIG. 10 illustrates a non-transitory media according to one or more example embodiments.

DETAILED DESCRIPTION

Example embodiments describe an apparatus, method and computer program relating to rendering (i.e. image synthesis) visual content (e.g. images) on a display screen.

A display screen may be comprise part of a television, monitor, laptop, tablet, smart phone, whiteboard or any device capable of displaying digital images or other visual content. A display screen may include a Liquid Crystal Display (LCD), Light Emitting Diode (LED) backlit LCD, Thin-Film Transistor LCD, Quantum dot (QLED), LED, Organic LED, Active Matrix Organic LED (AMOLED), Super AMOLED, Plasma Display Panel or any device for presentation of information in visual form. Generally, a display screen comprises a display size, aspect ratio, resolution (i.e. the number of pixels displayed on the display screen in terms of height and width), and pixel density.

Rendering may involve generating an image on a display screen. This may be achieved using a processor such as a Central Processing Unit (CPU) or a Graphics Processing Unit (GPU). For example, a CPU/GPU may translate image data into bitmaps which are then transmitted on the display screen. The image data may comprise colour values for specific positions (e.g. coordinates) on the display screen.

Visual content (or images) may comprise one or more pixels on the display screen. Generally, the processor can render the content at specific pixel(s) on the display screen. Rendering the visual content at a first set of pixel(s) may generate an image at a first position on the display screen. Rendering the visual content at a second set of pixels may generate an image at a second position on the display screen.

An eye correction means may include glasses comprising optical lenses. In some embodiments, the optical lenses are bifocal or varifocal lenses. The optical properties of the optical lenses may include optical power, focus length, magnification, transparency or any other property related to optical lenses. The optical lenses may have different optical properties across the lens; for example a bifocal lens may comprise a first focal length at a first portion/section of the lens and a second focal length at a second portion/section of the lens. The optical properties may change depending on the environmental conditions. The optical properties may change (or be different) depending on the actions of the user; for example, the user gaze direction i.e. the direction of the users eyes through the lens (such as a visual axis vector through the lens). The user actions may also include the user head orientation, face orientation, opening or closing of eyes etc.

Figure 1:
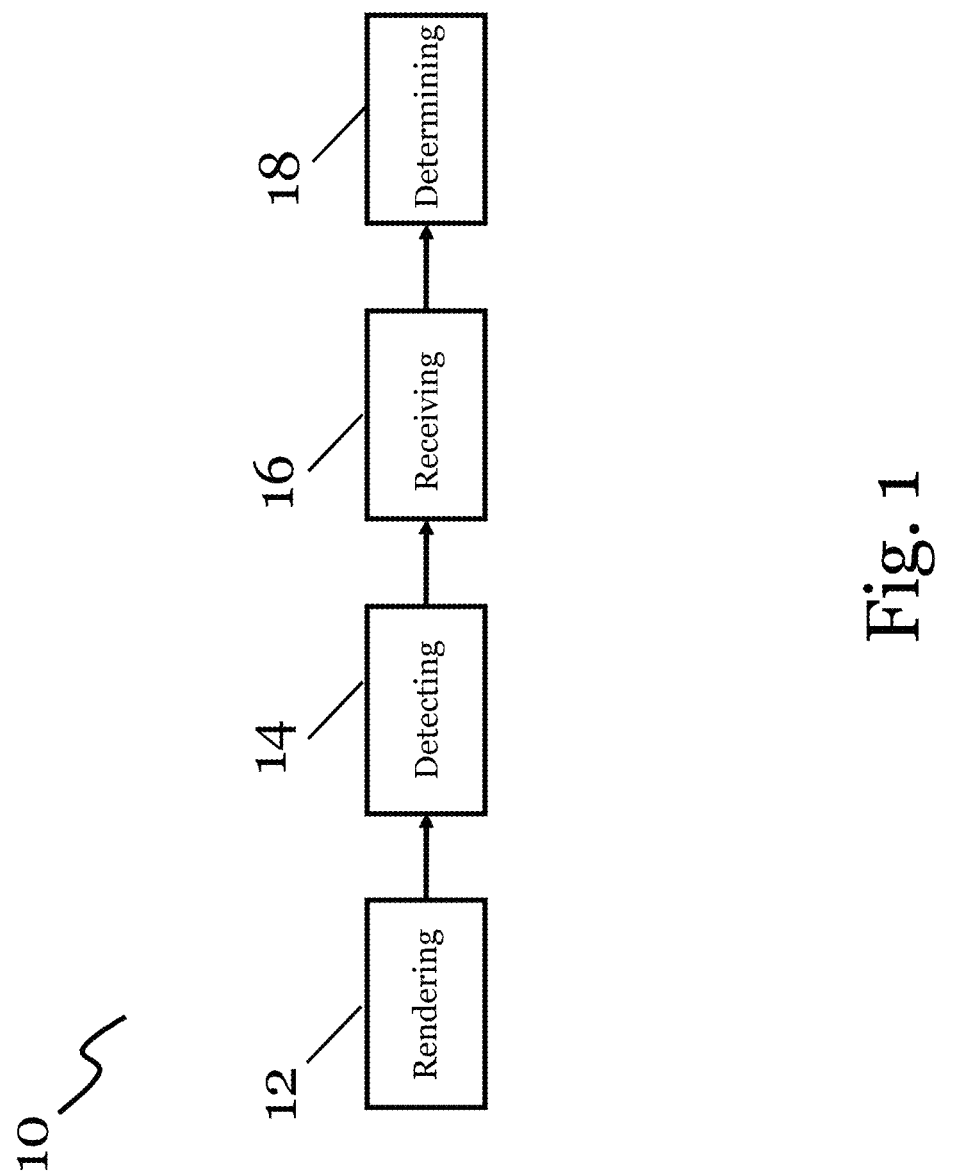
FIG. 1 illustrates an apparatus according to one or more example embodiments.

FIG. 1 illustrates an apparatus, indicated generally by reference numeral 10, according to one or more example embodiments. The apparatus 10 comprises a means for rendering 12 (labelled as "Rendering") visual content on a display screen (not shown). The means for rendering 12 is configured to render said visual content at a first rendering position on the display screen. The apparatus 10 further comprises means for detecting 14 (labelled as "Detecting") a user gaze direction through an eye correction means (not shown). The apparatus 10 further comprises a means for receiving data 16 (labelled as "Receiving") relating to optical properties of the eye correction means. The optical properties may be a function of user gaze direction through the eye correction means. The data may comprise optical properties at least at the detected user gaze direction. The data may further comprise optical properties at other user gaze directions towards the display screen. The data may further comprise optical properties at user gaze directions away from the display screen. The apparatus 10 further comprises a means for determining 18 (labelled as "Determining") if said optical properties at said detected user gaze direction provide a threshold level of suitability for said user viewing said visual content on said display screen. In some embodiments, the functions provided by any two or more of said means (12, 14, 16, 18) may be performed by one or more of the other of said means (12, 14, 16, 18).

Figure 2:
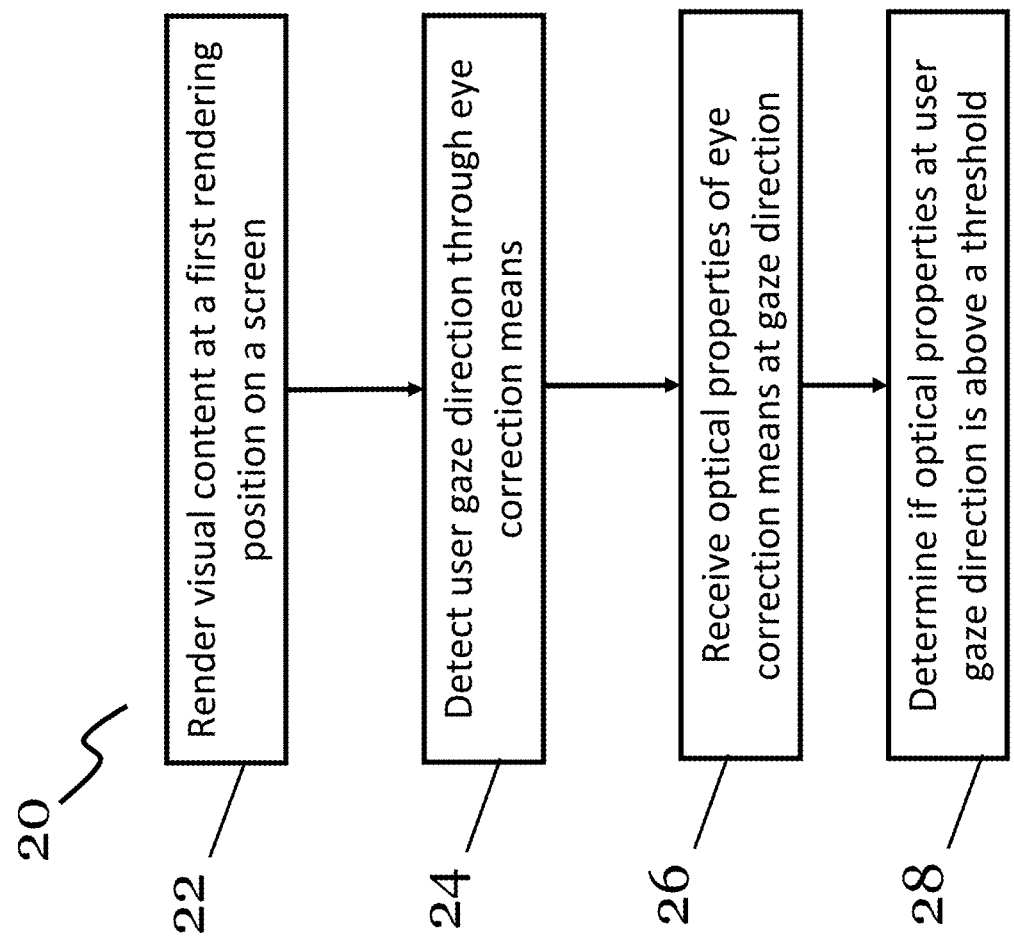
FIG. 2 is a flow diagram indicating processing operations that may be performed by the apparatus of FIG. 1, according to one or more example embodiments.

FIG. 2 is a flow diagram, indicated generally by reference numeral 20. The flow diagram 20 indicates processing operations that may be performed by the apparatus of FIG. 1, according to one or more example embodiments. The processing operations may, for example, be performed by hardware, software, firmware or a combination thereof.

A first operation 22 may comprise rendering visual content at a first rendering position on a display screen.

A second operation 24 may comprise detecting a user gaze direction through an eye correction means towards said first rendering position.

A third operation 26 may comprise receiving data relating to optical properties of the eye correction means at the user gaze direction.

A fourth operation 28 may comprise determining if said optical properties at said detected user gaze direction provide a threshold level of suitability for viewing said visual content.

Figure 3:
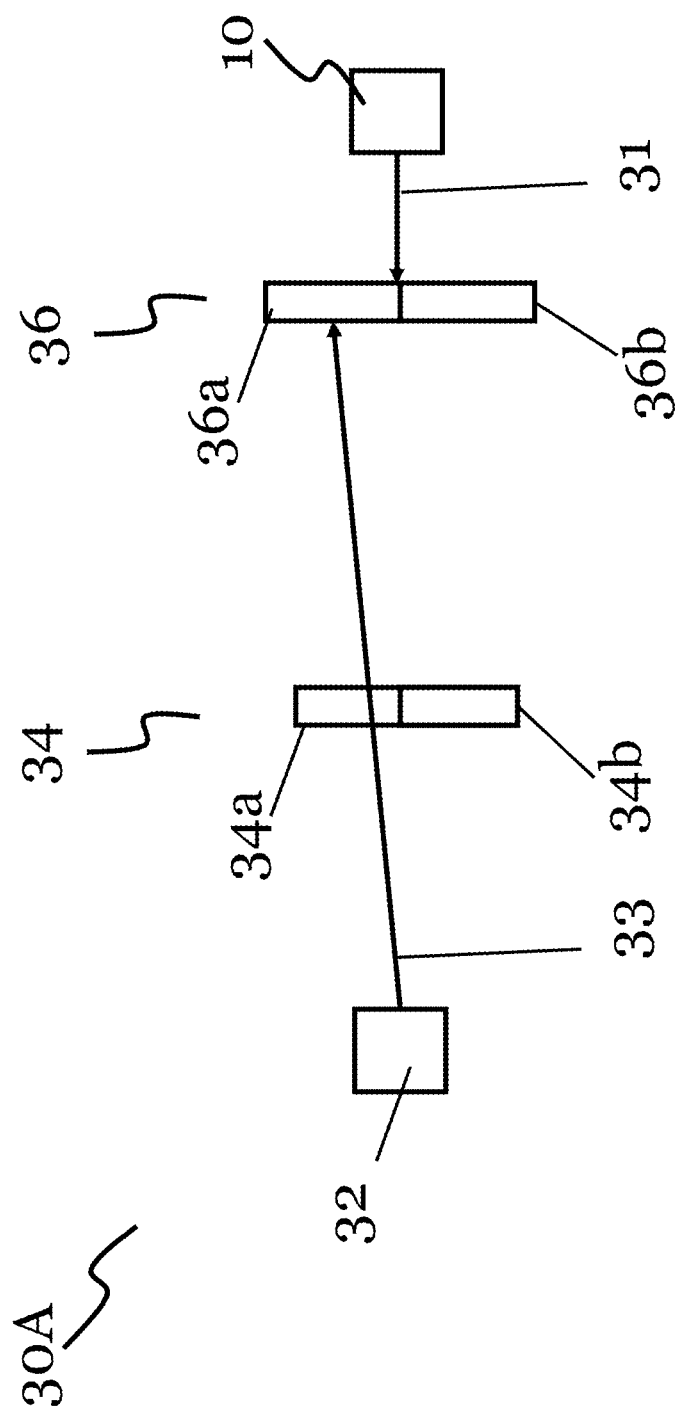
FIGS. 3 to 5 illustrate systems according to example embodiments.

FIG. 3 illustrates a system indicated generally by reference numeral 30A, according to one or more example embodiments. The system 30A includes the apparatus 10 described above in relation to FIG. 1.

The apparatus 10 may comprise (or be connected to) means for rendering 12 visual content on a display screen 36. The apparatus 10 may be able to transfer the rendered visual content (e.g. image data relating to visual content) to a display screen 36 via a datalink 31. The display screen 36 may comprise at least a first rendering position 36a and a second rendering position 36b. The means for rendering 12 may be configured to render said visual content at the first rendering position 36a or second rendering position 36b on said display screen 36.

A user 32 may be positioned near the display screen 36. The user 32 may be viewing the display screen 36 such that the user's gaze direction is towards (i.e. intersects) the display screen 36. The user 32 may be wearing eye correction means 34 (e.g. bifocal glasses). The eye correction means 34 may comprise at least two lens 34a, 34b for example bifocal or varifocal lenses. The user 32 may be viewing the display screen 36 through the eye correction means 34; for example for improved optical focus. For example, the user 32 may be viewing visual content at the first rendering position 36a through the first lens 34a. In other words, the user 32 gaze direction 33 may intersect the eye correction means 34 through the first lens 34a and intersect the display screen 36 at the first rendering position 36a.

In some example embodiments, the apparatus 10 comprises a means for determining 18 an intersection point of said user gaze direction 33 relative to said display screen 36. For example, the apparatus 10 may be able to determine whether the user 32 is looking away from the display screen 36. In some embodiments, the apparatus 10 may be able to determine whether the user 32 is looking towards the display screen 36. In some embodiments, the apparatus 10 may be able to determine whether the user 32 is looking at the first rendering position 36a or second rendering position 36b.

The apparatus 10 may further comprise means for detecting 14 a user gaze direction 33 through said eye correction means 34. In some embodiments, the apparatus 10 may be able to detect a user gaze direction 33 through said eye correction means 34 towards said first rendering position 36a or said second rendering position 36b.

The apparatus 10 may comprise means for receiving data 16 relating to optical properties of the eye correction means 34. The optical properties may be a function of user gaze direction 33 through said eye correction means 34. For example, the first lens 34a may have an optical power configured for viewing distant objects and the second lens 34b may have an optical power configured for viewing near objects. The data may comprise at least optical properties of the eye correction means 34 at the user gaze direction 33 i.e. the optical properties of the first lens 34a or the second lens 34b.

The apparatus 10 may further comprise means for determining 18 if said optical properties at the detected user gaze direction 33 provide a threshold level of suitability for said user 32 viewing said visual content on said display screen 36. For example, the first lens 34a may be configured for distant objects, the first lens 34a may not provide a threshold level of suitability for the user 32 viewing the visual content at the first rendering position 36a because the display screen 36 is a near object (relative to the user 32). For example, the visual content at the first rendering position 36a may be out of focus for the user 32.

Figure 4:
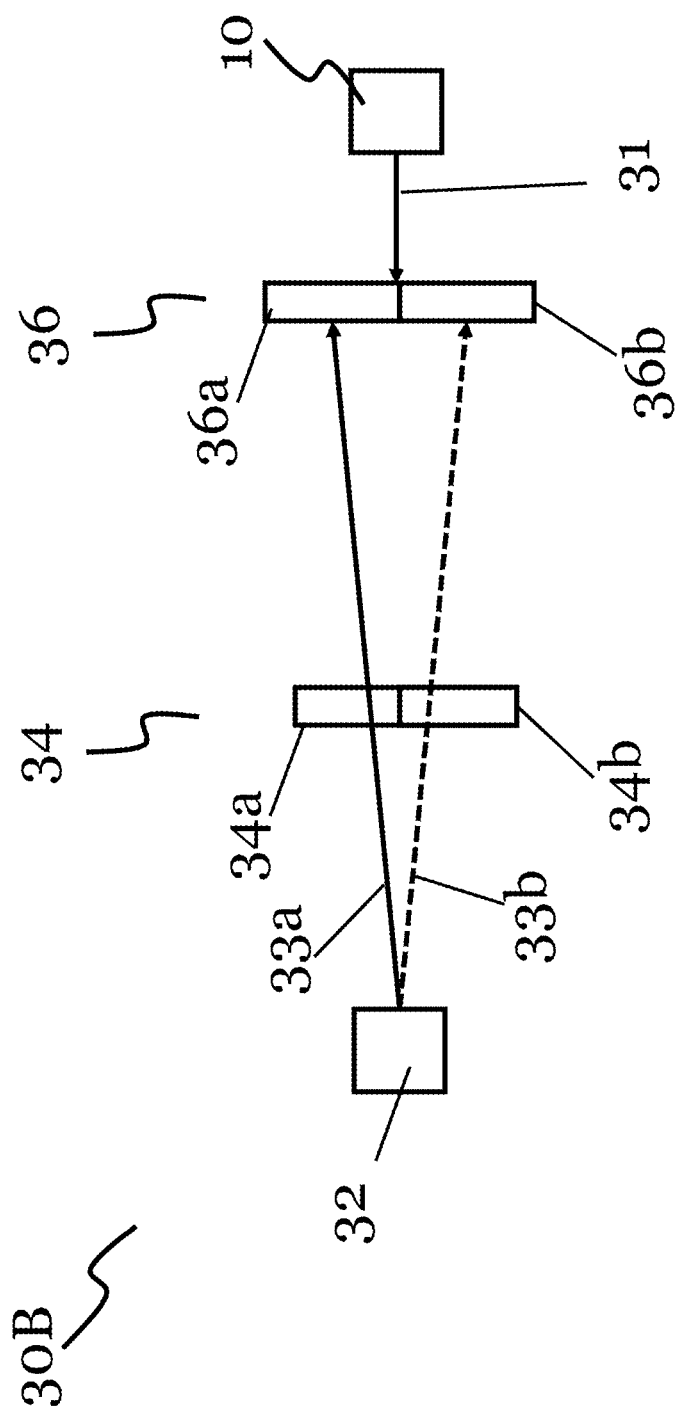

FIG. 4 illustrates a system, indicated generally by reference numeral 30B, according to one or more example embodiments. The system 30B includes the apparatus 10 described above.

In some embodiments, the means for rendering 12 may be configured to render the visual content at the second rendering position 36b on said display screen 36 if said optical properties of said eye correction means 34 at said detected gaze direction 33a provide a suitability below said threshold level. For example, the visual content at the first rendering position 36a may be out of focus for the user 32.

In some embodiments, the second rendering position 36b is configured to cover user gaze directions having a suitability above said threshold level 33b. For example, the second lens 34b may be configured for viewing near objects, thus the second lens 34b may provide a threshold level of suitability for the user 32 viewing the visual content at the second rendering position 36b because the display screen 36 is a near object (relative to the user 32).

Figure 5:
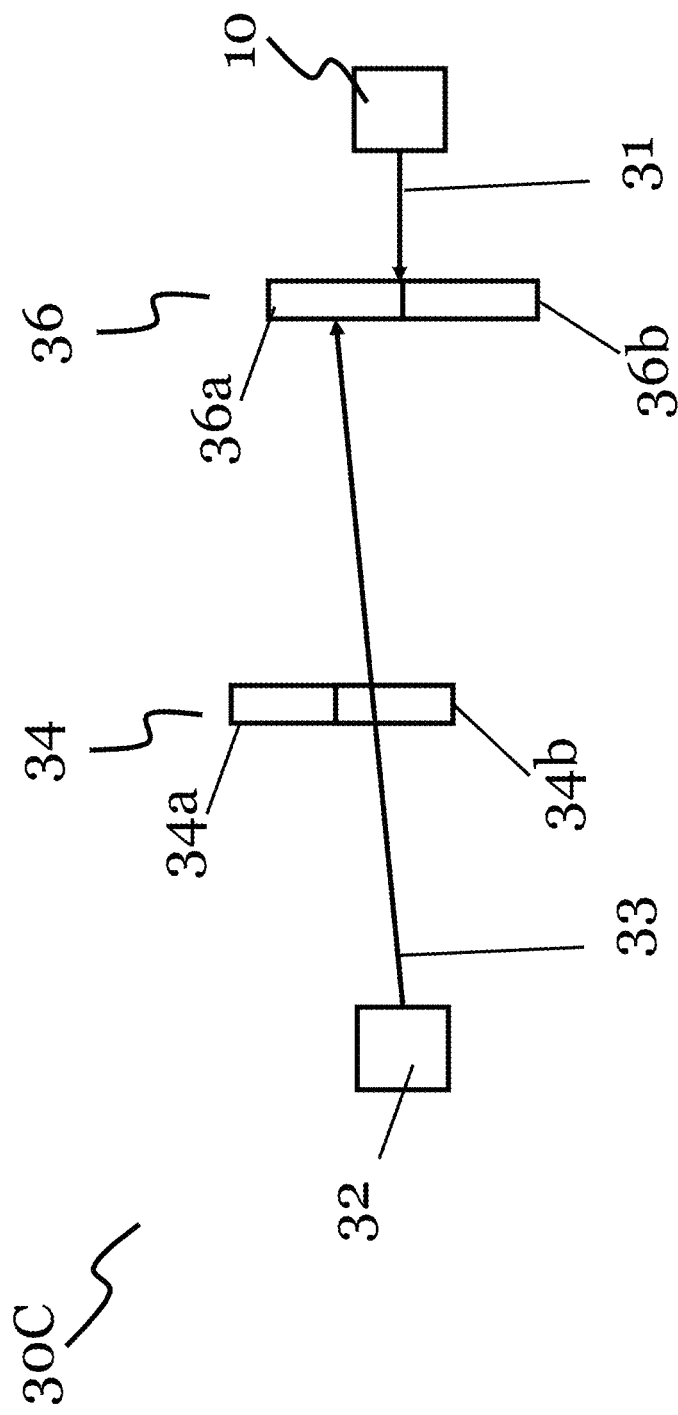

FIG. 5 illustrates a system, indicated generally by reference numeral 30C, according to one or more example embodiments. The system 30C includes the apparatus 10 described above.

In the system 30C, the user 32 may be viewing visual content at the first rendering position 36a through the second lens 34b. In other words, the user 32 gaze direction 33 may intersect the eye correction means 34 through the second lens 34b and intersect the display screen 36 at the first rendering position 36a.

The second lens 34b may be configured for near objects, the second lens 34b may therefore provide a threshold level of suitability for the user 32 viewing the visual content at the first rendering position 36a because the display screen 36 is a near object (relative to the user 32). For example, the visual content at the first rendering position 36a may be in focus for the user 32.

In some example embodiments, the means for rendering 12 may be configured to continue to render the visual content at the first rendering position 36a because said detected gaze direction 33 has a suitability at or above said threshold level and said intersection point is within said first rendering position 36a.

Figure 6:
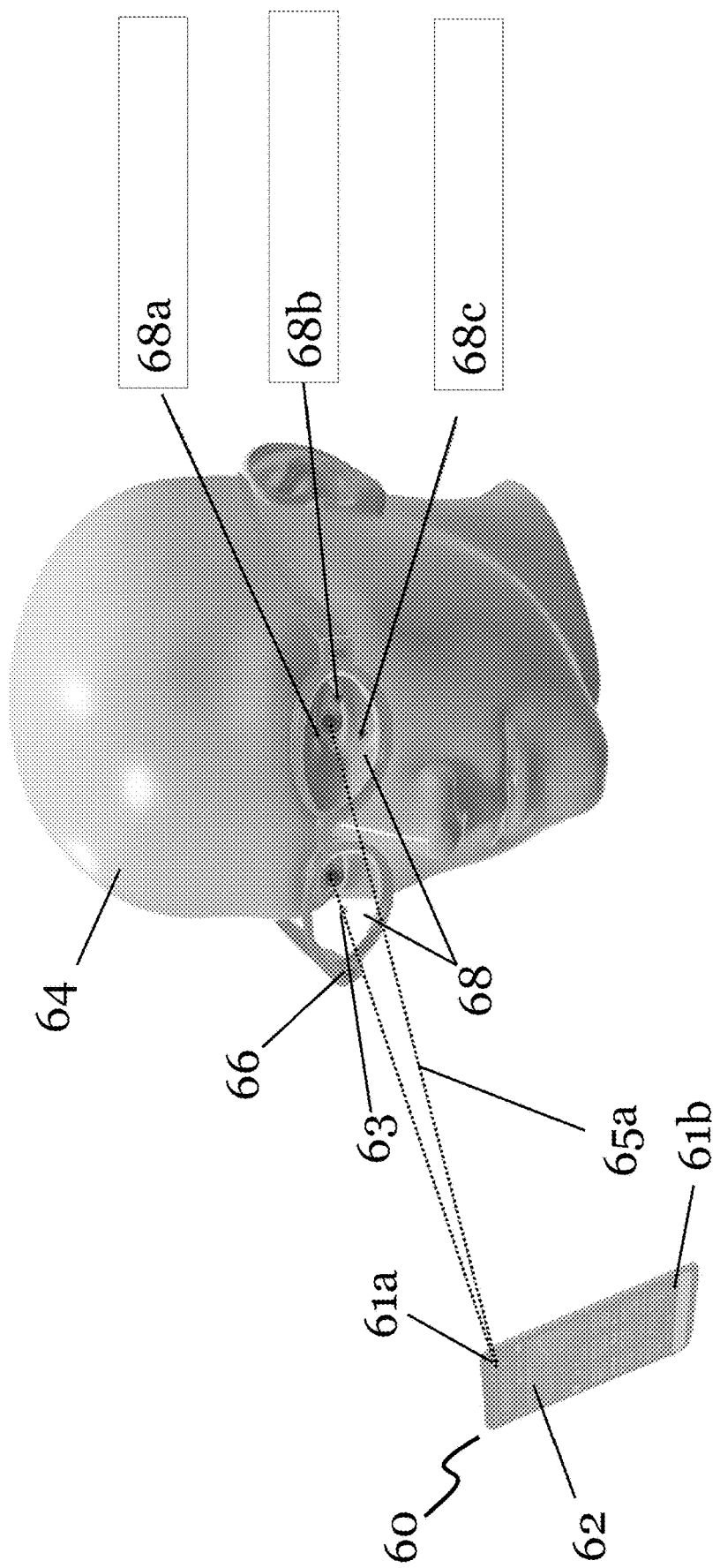
FIG. 6 illustrates an apparatus according to one or more example embodiments.

FIG. 6 illustrates an apparatus, indicated generally by reference 60, according to one or more example embodiments. The apparatus 60 may comprise (or be connected to) a display screen 62; for example the apparatus 60 may be a user device such as a smart phone. The apparatus 60 may comprise a means for rendering 12 visual content on the display screen 62 at one of a first rendering position 61a or a second rendering position 61b on the display screen 62.

A user 64 of the apparatus 60 may be viewing visual content on the display screen 62. The user 64 may be wearing eye correction glasses 66. The glasses 66 may comprise varifocal lenses 68. The varifocal lenses 68 may comprise: a first lens 68a configured for viewing objects at long distances, a second lens 68b configured for intermediate distances and a third lens 68c configured for short distances (e.g. reading). The first, second and third lenses 68a, 68b, 68c may be arranged as a top portion, middle portion and bottom portion of varifocal lens 68 respectively.

The apparatus 60 may comprise means for receiving data 16 relating to the optical properties of the varifocal lenses 68 as a function of user gaze direction through the varifocal lenses 68. For example, the apparatus 60 may receive data indicating that user gaze directions through the first lens 68a are configured for long distances, gaze directions through the second lens 68b are configured for intermediate distances and gaze directions through the third lens 68c are configured for short distances.

The apparatus 60 may comprise means for detecting 14 if the user 64 is looking towards/at the display screen 62 or away from the display screen 62. The apparatus 60 may comprise means for recognising if the user 64 is wearing glasses 66 with the lenses 68 (i.e. the eye correction means relating to the received optical properties data). The apparatus 60 may further comprise means for detecting 14 the user gaze direction 65a through the varifocal lenses 68. In some example embodiments, the apparatus 60 may further comprise means for determining the relative position and/or orientation of said display screen 62 and said eye correction means (lenses 63). In some embodiments, the apparatus 60 may further comprise means for determining the topology of the face of the user 64. In some embodiments, the apparatus 60 may further comprise means for determining the pupil of the user 64. The apparatus 60 may be configured to use any of this information to determine the user gaze direction 65a through the varifocal lenses 68. The apparatus 60 may comprise means for determining 18 if the optical properties at that gaze direction 65a is suitable for viewing the display screen 62.

For example, in some embodiments, the visual content is a notification on a smart phone. The rendering means 12 may render the notification at a first rendering position 61a the top of the display screen 62 initially. The user 64 looks at the notification at the first rendering position 61a. The user gaze direction 65a therefore intersects the varifocal lenses 68 at the second lens 68b (e.g. the middle of the lens 68). Since the second lens 68b is configured for intermediate distances, the notification at the first rendering position 61a may appear out of focus to the user 64 and thus does not provide a threshold level of suitability for the user 64 viewing the display screen 62 at this gaze direction 65a.

In some example embodiments, the apparatus 60 further comprises means for tracking the position and orientation of the display screen 62. In some embodiments, the apparatus 60 further comprises means for tracking the position and orientation of the glasses 66. In some embodiments, the apparatus 60 further comprises means for gaze tracking.

In some example embodiments, the glasses 66 are Augmented Reality (AR) Glasses. In some embodiments, the apparatus 60 further comprises means for gaze tracking in the AR glasses. In some embodiments, the apparatus 60 further comprises means for gaze tracking calibration in AR glasses. In some embodiments, the apparatus 60 further comprises means for device pairing, i.e. creating initial connections between devices of the display screen 62 to enable multi-device interactions. Also known as device association or coupling. In some embodiments, the apparatus 60 further comprises liquid crystal shutters in the AR glasses, adjusting the transparency of the glasses.

Figure 7:
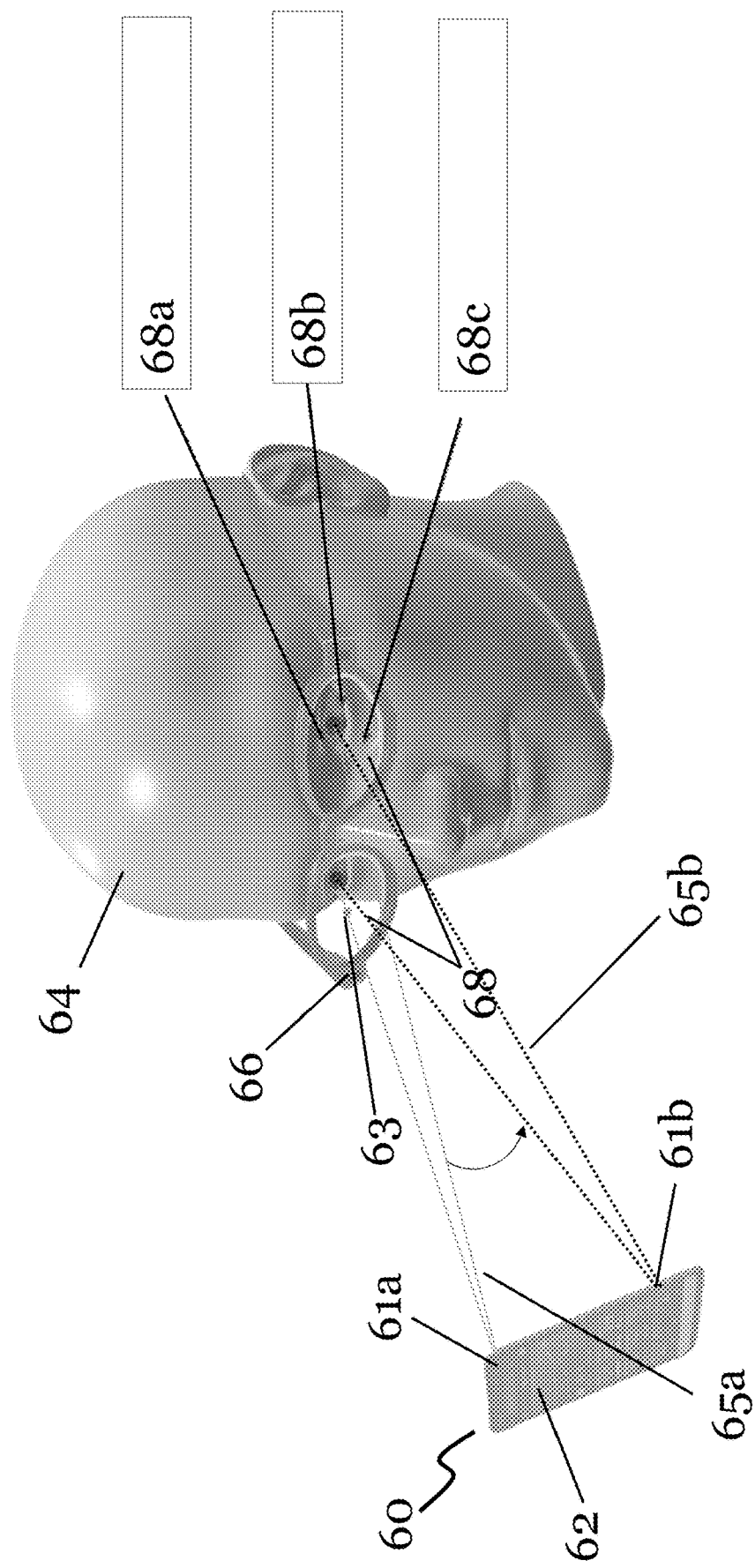
FIG. 7 illustrates an apparatus according to one or more example embodiments.

FIG. 7 illustrates an apparatus, indicated generally by reference 60, according to one or more example embodiments. The apparatus 60 may be the same or similar to apparatus 60 described in relation to FIG. 6.

In some example embodiments, the means for rendering 12 may be configured to render the notification at a second rendering position 61b if detected gaze direction 65a has a suitability below said threshold level and said intersection point is within said first rendering position 61a. For example, the visual content at the first rendering position 61a may be out of focus for the user 64 because their gaze direction 65a intersects the varifocal lens 68 at the second lens 68b (configured for long distances). Therefore, the user 64 may switch their gaze direction 65b towards the second rendering position 61b. Gaze direction 65b intersects the lenses 63 at the third lens 68c (configured for short distances). Consequently, the notification appears in focus to the user 64.

In some example embodiments, the means for rendering 12 only renders the visual content at one of the first rendering position 61a or the second rendering position 61b. In some embodiments, the means for rendering 12 renders the visual content at both the first rendering position 61a and the second rendering position 61b. In some embodiments, the means for rendering is further configured to smoothly transition said visual content from said first rendering position 61a to said second rendering position 61b. For example, the visual content may appear at the first rendering position

61*a* initially and be configured to appear to transition (i.e. slide or fade) down the display screen 62 to the second rendering position 61*b*. This may guide the user gaze direction from the first gaze direction 65*a* to the second gaze direction 65*b*.

Figure 8:
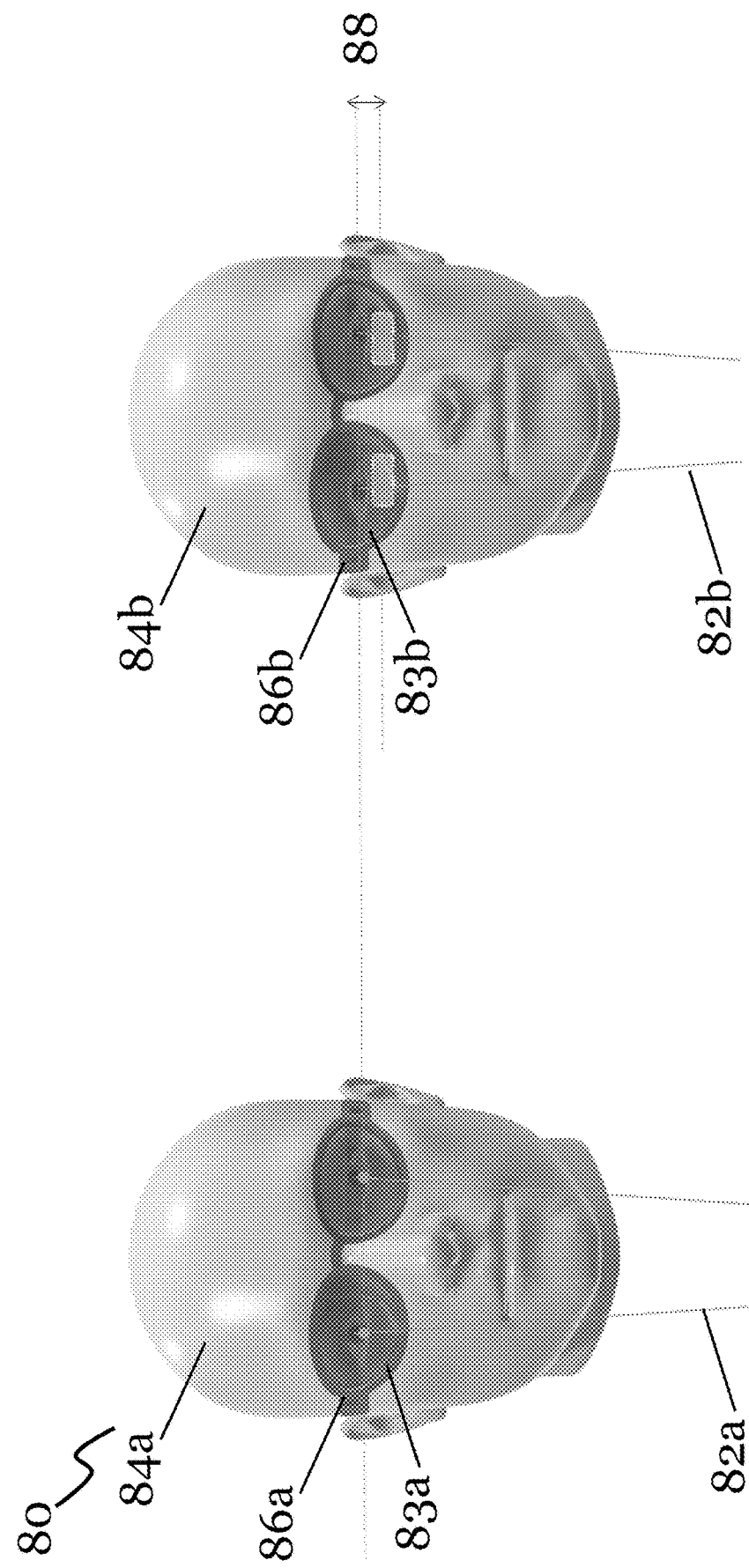
FIG. 8 illustrates an apparatus according to one or more example embodiments.

FIG. 8 illustrates an apparatus, indicated generally by reference 80, according to example embodiments. The apparatus 80 may be the same or similar to any embodiment of the apparatus described in relation to FIG. 1 above.

A user 84 is wearing Augmented Reality (AR) glasses 86. In some embodiments, the AR glasses 86 comprise eye correction means i.e. lenses 83 which may be the same or similar to any of the lenses as discussed above. The user 84 may be viewing a display screen (such as display screen 62) (not shown) whilst wearing the AR glasses 86. The display screen may be a smart phone, tablet, monitor etc. The AR glasses 86 may comprises a datalink with the device of the display screen to enable exchange of information between them. In some embodiments, this information may be used to determine the relative position and orientation of the AR glasses 86 and display screen. In some embodiments, this information may be used to determine the user gaze direction through the lenses 83.

In some embodiments, the apparatus 80 further comprises a means for controlling transparency of the AR glasses 86 at one or more gaze directions. In some embodiments, the device of the display screen may control the transparency of the AR glasses 86. The transparency control means may be configured to provide a first transparency level at gaze directions having a suitability above said threshold level and a second transparency level at user gaze directions having a suitability below said threshold level, wherein said first transparency level is higher than said second transparency level. For example, the AR glasses 86 may comprise a shutter over the lens 83 configured to adjust the transparency of the lens 83.

For example, in a first condition shown on the left of FIG. 8, user 84*a* may be viewing objects at intermediate distances through the middle of the lens 83*a* i.e. the user gaze direction 82*a* is through the middle of the lens 83*a*. For example, the user 84*b* may not be looking at a nearby display screen. The shutter in the AR glasses 86*a* may therefore provide a uniform transparency across the lens 83*a*. The uniform transparency may be the highest or adjust due to environmental conditions, for example. In a second condition, shown on the right of FIG. 8, user 84*b* may be viewing a display screen through the bottom of the lens 83*b* i.e. the user gaze direction 82*b* is through the bottom of the lens 83*b*. For example, the user 84 may have switched 88 a gaze direction 82*a* to a gaze direction 82*b* due to the display screen moving visual content from a first position to a second position; as described above in relation to FIG. 7.

To further optimize viewing, the shutter in the AR glasses 86*b* may therefore provide an increased transparency in the bottom portion of the lens 83*b* compared to other portions.

In some example embodiments, the apparatus further comprises means for controlling the focus of said eye correction means at one or more gaze directions. For example, the AR glasses 86 may comprise optics employing active focus correction. The focus may be optimized for viewing the displays screen. In some embodiments, the focus is controlled by the device of the display screen (e.g. a smartphone etc). In some embodiments, both the transparency and focus of the AR glasses 86 may be adjusted to provide a combined effect; thus further optimizing the viewing experience of the user 84. For example, a notification may be rendered at the bottom of the display screen (as described in relation to FIG. 7). The apparatus 80 then controls the optical power of the AR glasses lens 83 to adjust as needed and in an area corresponding to user gaze directions towards the visual content e.g. gaze directions through the bottom of the lens 83. In some embodiments, the focus control means is configured to adjust other areas of the lens 83 i.e. gaze directions away from the visual content (e.g. gaze direction through the middle and top of the lens 83) such that they are out of focus. The apparatus 80 may also control the transparency in the same area as discussed above.

In some example embodiments, the apparatus may further comprise means for determining a focus of said user's eyes. In some embodiments, the focus control means uses the determined user eye focus to adjust the focus of the AR glasses 86. In some embodiments, the AR glasses 86 may use structured light to determine the focus of user's eyes. For example, the AR glasses 86 may illuminate the eye of the user by using structured infrared light and capture the changes in the curvature of the optical surfaces of the eye from the changes in the pattern of the light reflected back.

In some example embodiments, the focus control means may provide a temporal focus adjustment. This may be beneficial for example for users whose the ability to shift from one focus distance to another focus distance in the visual field slows down.

The measured focus of the users eyes may be used to dynamically adjust the transparency and/or focus of the AR glasses 86.

EXAMPLE APPARATUS

FIG. 9 shows an apparatus according to some example embodiments, which may comprise the user terminal. The apparatus may be configured to perform the operations described herein, for example operations described with reference to any disclosed process. The apparatus comprises at least one processor 90 and at least one memory 91 directly or closely connected to the processor. The memory 91 includes at least one random access memory (RAM) 91*a* and at least one read-only memory (ROM) 91*b*. Computer program code (software) 95 is stored in the ROM 91*b*. The apparatus may be connected to a transmitter (TX) and a receiver (RX). The apparatus may, optionally, be connected with a user interface (UI) for instructing the apparatus and/or for outputting data. The at least one processor 90, with the at least one memory 91 and the computer program code 95 are arranged to cause the apparatus to at least perform at least the method according to any preceding process, for example as disclosed in relation to the flow diagrams of FIG. 2 and related features thereof.

FIG. 10 shows a non-transitory media 100 according to some embodiments. The non-transitory media 100 is a computer readable storage medium. It may be e.g. a CD, a DVD, a USB stick, a blue ray disk, etc. The non-transitory media 100 stores computer program code, causing an apparatus to perform the method of any preceding process for example as disclosed in relation to the flow diagrams and related features thereof.

Names of network elements, protocols, and methods are based on current standards. In other versions or other technologies, the names of these network elements and/or protocols and/or methods may be different, as long as they provide a corresponding functionality. For example, embodiments may be deployed in 2G/3G/4G/5G networks and further generations of 3GPP but also in non-3GPP radio networks such as WiFi.

A memory may be volatile or non-volatile. It may be e.g. a RAM, a SRAM, a flash memory, a FPGA block ram, a DCD, a CD, a USB stick, and a blue ray disk.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Some embodiments may be implemented in the cloud.

It is to be understood that what is described above is what is presently considered the preferred embodiments. However, it should be noted that the description of the preferred embodiments is given by way of example only and that various modifications may be made without departing from the scope as defined by the appended claims.

The invention claimed is:

1. An apparatus comprising:
   at least one processor; and
   at least one non-transitory memory storing instructions that, when executed by the at least one processor, cause the apparatus at least to:
   render visual content at a first rendering position on a display screen;
   detect a user gaze direction through an eye correction means towards said first rendering position;
   receive data relating to optical properties of said eye correction means at said detected user gaze direction;
   determine if said optical properties at said detected user gaze direction provide a threshold level of suitability for viewing said visual content;
   render said visual content at a second rendering position on said display screen if said optical properties at said detected user gaze direction is below said threshold level; and
   control transparency of said eye correction means at one or more user gaze directions, wherein the controlling of the transparency comprises providing a first transparency level at user gaze directions having a suitability above said threshold level and a second transparency level at user gaze directions having a suitability below said threshold level, wherein said first transparency level is higher than said second transparency level.

2. The apparatus according to claim 1, wherein said second rendering position corresponds to a second user gaze direction through said eye correction means, wherein optical properties of said second user gaze direction is above said threshold level.

3. The apparatus according to claim 1, wherein the rendering further comprises smoothly transitioning said visual content from said first rendering position to said second rendering position.

4. The apparatus according to claim 1, wherein said eye correction means comprise augmented reality glasses.

5. The apparatus according to claim 1, wherein the controlling of the transparency further comprises providing said first transparency level at user gaze directions away from said display screen.

6. The apparatus according to claim 1, wherein the apparatus is further caused to control the focus of said eye correction means at one or more user gaze directions.

7. The apparatus according to claim 6, wherein the controlling of the focus comprises focusing said eye correction means onto said display screen at user gaze directions having a suitability above said threshold level.

8. The apparatus according to claim 1, wherein the apparatus is further caused to determine a focus of said user's eyes.

9. The apparatus according to claim 1, wherein the apparatus is further caused to determine at least one of a relative position or orientation of said display screen and said eye correction means.

10. A method comprising:
    rendering visual content at a first rendering position on a display screen;
    detecting a user gaze direction through an eye correction means towards said first rendering position;
    receiving data relating to optical properties of said eye correction means at said detected user gaze direction;
    determining if said optical properties at said detected user gaze direction provide a threshold level of suitability for viewing said visual content;
    rendering said visual content at a second rendering position on said display screen if said optical properties at said detected user gaze direction is below said threshold level; and
    controlling transparency of said eye correction means at one or more user gaze directions, wherein the controlling of the transparency comprises providing a first transparency level at user gaze directions having a suitability above said threshold level and a second transparency level at user gaze directions having a suitability below said threshold level, wherein said first transparency level is higher than said second transparency level.

11. The method of claim 10, wherein said second rendering position corresponds to a second user gaze direction through said eye correction means, wherein optical properties of said second user gaze direction is above said threshold level.

12. The method of claim 10, wherein the rendering further comprises:
    smoothly transitioning said visual content from said first rendering position to said second rendering position.

13. The method of claim 10, wherein the controlling of the transparency further comprises:
    providing said first transparency level at user gaze directions away from said display screen.

14. The method of claim 10, further comprising:
    controlling the focus of said eye correction means at one or more user gaze directions.

15. The method of claim 14, wherein the controlling of the focus comprises:
    focusing said eye correction means onto said display screen at user gaze directions having a suitability above said threshold level.

16. A non-transitory computer readable medium comprising program instructions that, when executed by an apparatus, cause the apparatus to perform at least the following:
    rendering visual content at a first rendering position on a display screen;

detecting a user gaze direction through an eye correction means towards said first rendering position;

receiving data relating to optical properties of said eye correction means at said detected user gaze direction;

determining if said optical properties at said detected user gaze direction provide a threshold level of suitability for viewing said visual content;

rendering said visual content at a second rendering position on said display screen if said optical properties at said detected user gaze direction is below said threshold level; and controlling transparency of said eye correction means at one or more user gaze directions, wherein the controlling of the transparency comprises providing a first transparency level at user gaze directions having a suitability above said threshold level and a second transparency level at user gaze directions having a suitability below said threshold level, wherein said first transparency level is higher than said second transparency level.

* * * * *